United States Patent [19]

Walters et al.

[11] 3,769,097
[45] Oct. 30, 1973

[54] METHOD OF REMOVING SMOKE AND FUMES PRODUCED BY FLAME CUTTING OF METAL PLATES RECEIVED ON A BURNING TABLE

[75] Inventors: Joseph J. Walters; Verdun R. McGibbon, both of Coatesville, Pa.

[73] Assignee: Lukens Steel Company, Coatesville, Pa.

[22] Filed: June 8, 1972

[21] Appl. No.: 260,751

Related U.S. Application Data

[62] Division of Ser. No. 88,876, Nov. 12, 1970, Pat. No. 3,701,514.

[52] U.S. Cl. ................................................ 148/9 R
[51] Int. Cl. ............................................... B23k 7/02
[58] Field of Search ....................... 148/9; 266/23 P, 266/23 K

[56] References Cited
UNITED STATES PATENTS
3,627,591  12/1971  Pfeuffer ................................ 148/9

*Primary Examiner*—W. W. Stallard
*Attorney*—Mason, Mason & Albright

[57] ABSTRACT

The combination of a table for cutting steel plate and an exhaust system for evacuating the fumes and smoke produced by the cutting operation. The expendable grating of the cutting table utilizes bars which are diagonal to the usual cutting directions and are connected by staggered stiffening bars also diagonally located so that the bars are not normally cut along their longitudinal axis. Duct work under the grating comprises heavy vertically extending removable plates resting on edge which additionally provide support for the grating and lead to an elongated exhaust manifold channel having a plurality of openings and a normally closed plate covering each of such openings. The openings are disposed in a horizontal dividing plate and communicate with the space formed between each of the vertically extending plates making up the ductwork under the grating. The cover plates are hinged and raised from a horizontal position by a pneumatic cylinder actuated through a photoelectric cell which is responsive to light from plasma of the cutting torch. The photoelectric cell further actuates adjacent cover plates on either side of the cover plate which corresponds to the duct with which the photoelectric cell involved is aligned. Each hinged cover plate has a deep lip soft sealed ring which seats on the peripheral surface of the dividing plate about the corresponding opening and the arrangement is such that the fumes must make a 90° turn prior to entering the opening which slings out heavy particles which then drop to the bottom of the exhaust chamber for easy removal.

20 Claims, 7 Drawing Figures

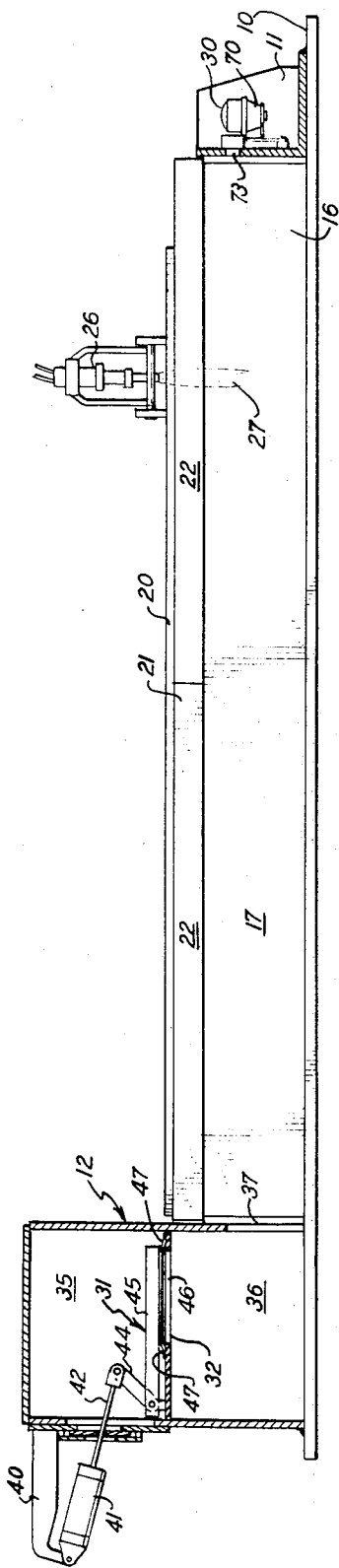
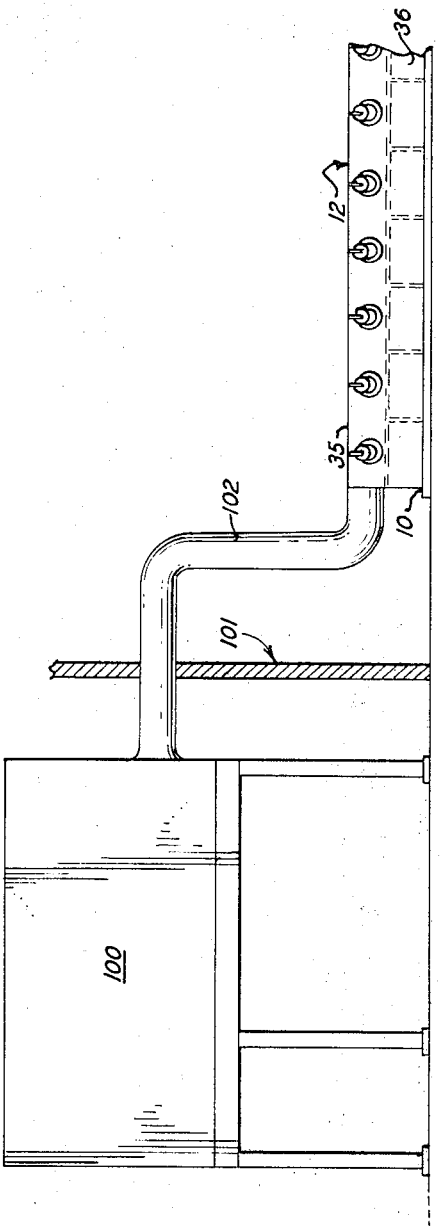

METHOD OF REMOVING SMOKE AND FUMES PRODUCED BY FLAME CUTTING OF METAL PLATES RECEIVED ON A BURNING TABLE

RELATED APPLICATIONS

This is a divisional application of application Ser. No. 88,876 filed Nov. 12, 1970, now U.S. Pat. No. 3,701,514.

BACKGROUND OF THE INVENTION

The invention involves a cutting table with an expendable grating in combination with an exhaust system wherein the exhaust action is largely localized to the area where fumes and smoke are produced by the cutting torch.

Heretofore, buildings at steel plants and the like which were utilized for cutting steel and alloy plate were heavily contaminated with smoke and fumes caused by the cutting operation. Due to the contamination, it was not unusual for vision to be so restricted within the building that one could not see from one side to the other. It was necessary for the operator of the torch to utilize special breathing apparatus and the job was a dirty and unpopular one. A substantial portion of the contaminates produced by the plasma torch resulted not only from the plate being cut by the torch but also from the underlying structure which supported the plate and which, of necessity, was cut at least in its upper aspects at the same time. The problem of exhausting a cutting table for steel plate is aggravated because it must be sufficiently clear above same to permit loading and unloading of steel plate by means of the gantry or boom arrangement. Cutting tables are of a necessity large, for example they may cover an area in excess of 18 by 36 feet. To provide an overhead exhaust system for an area this size would require not only a very high capacity exhaust fan or other exhausting means but also hood and an exhaust ductwork of unusually large capacity.

The problems facing the inventors were manifold. The initial problem of effecting smoke removal from the cutting building was strongly related with the necessity that the apparatus be economical to fabricate and maintain and that it be rugged for mill service. In addition, cleaning of the apparatus should be easily accomplished and its operation and maintenance sufficiently simple so that it would be entrusted to unskilled individuals. Solutions to these problems within the restrictive economic and structural parameters have been obtained by the inventors through a systems design wherein each major component of a cutting table together with the cooperating exhaust system has been substantially modified to produce an interrelated apparatus functionally and structurally different from the known prior art.

SUMMARY OF THE INVENTION

In order to avoid exhausting the entire cutting table which was considered impractical, the inventors considered that the utilization of horizontal ducts under the cutting table with individual exhausting means would both localize the exhaust capacities to that of just a few ducts and permit the utilization of an exhaust system which is practical from both an economic and space standpoint. It was considered that if the support for the metal being cut was sufficiently thin, photoelectric cells might be actuated by the plasma produced by the torch to control the exhaust flow. But this in itself posed a problem inasmuch as it was known from experience that the support grating's vertical dimension has to be sufficient so that it could be cut repeatedly and still retain the structural capability to support heavy loads. Still further, the grating needed to be sufficiently flexible to withstand flattening by heavy loads without distortion by repeated heating and cutting. These requirements in themselves seemed inconsistent with the design of a grating which would permit the plasma of a cutting torch to extend below it in all types of torch cutting operations. Still further, the openings in the grating should be such as to provide support for small pieces of plate and scrap which may be left on the grating after completion of a cutting operation. Moreover, needless to say, the cost of the grating which is considered expendable could not be great. The inventors' solution was to locate the support bars diagonally at 45° whereby long cuts of the bars were statistically reduced when the usual rectangular type patterns are being cut in supported metal plates. Short stiffening bars are staggered between the supporting bars so that the longer diagonal bars remain stable to the extent that they will not roll or twist under impact while at the same time the entire assembly is sufficiently flexible for its purposes. The grating could have a greatly reduced vertical dimension for a given amount of use. Thus it was possible to provide photoelectric cells and associated circuitry for the actuation of exhaust from the ducts involved. The ducts have been formed by utilizing the steel plate partitions which support grating to function as the sides of the ducts and the work piece itself forms the top of the ducts. By making these partitions removable, cleaning becomes a simple task compared to conventional designs. The resulting structure is rugged and in combination with the expendable grating, the heavy plate partitions should last almost indefinitely. An exhaust system which is selective to the duct space wherein the actual burning and smoke production takes place is provided by a manifold located longitudinally adjacent the burning table and includes therein a series of openings, one of which is for each duct. Such openings are located in a horizontal dividing plate within the manifold and a simple hinged horizontal plate or door with a deep lip soft sealing ring provides a self-cleaning effective sealing vent door for each duct. Also an arrangement is provided whereby heavy particles and objects are slung out of the path of the air and dropped to the bottom plate of the chamber for each removal. The hinged door is virtually fool proof and is of a type which can be operated over an extended period without appreciable air leakage. The long lipped sealing ring eliminates the necessity of machining around the vent opening and alignment is therefore not critical. The arrangement also minimizes assembly time machining and thus contributes to economical fabrication. Although the air seal is not absolutely airtight, it is sufficiently so for the function of the apparatus and does not require adjustment.

The system has proved superior in operation. Fumes and smoke are effectively drawn away from under the metal plate being cut by the plasma torch and escape into the atmosphere of the building is minimal. The contaminates produced are carried away to a separation means and there is little or no contamination of the atmosphere of the cutting building or outside caused by the cutting operation. The operator of the equipment no longer needs breathing apparatus and the job is no longer an unpopular one. Thus the system in accordance with the invention is relatively easy to operate, clean and maintain, and functions effectively.

Other objects, adaptabilities and capabilities will appear as the description progresses, reference being had to the accompanying drawings, in which:

BRIEF DESCRIPTION OF THE DRAWINGS

FIG. 2 is a cross sectional view taken on lines II—II of FIG. 1;

FIG. 7 is an elevational view showing the relationship of the exhaust manifold with the baghouse wherein contaminates are separated.

DESCRIPTION OF PREFERRED EMBODIMENTS

Figure 1:
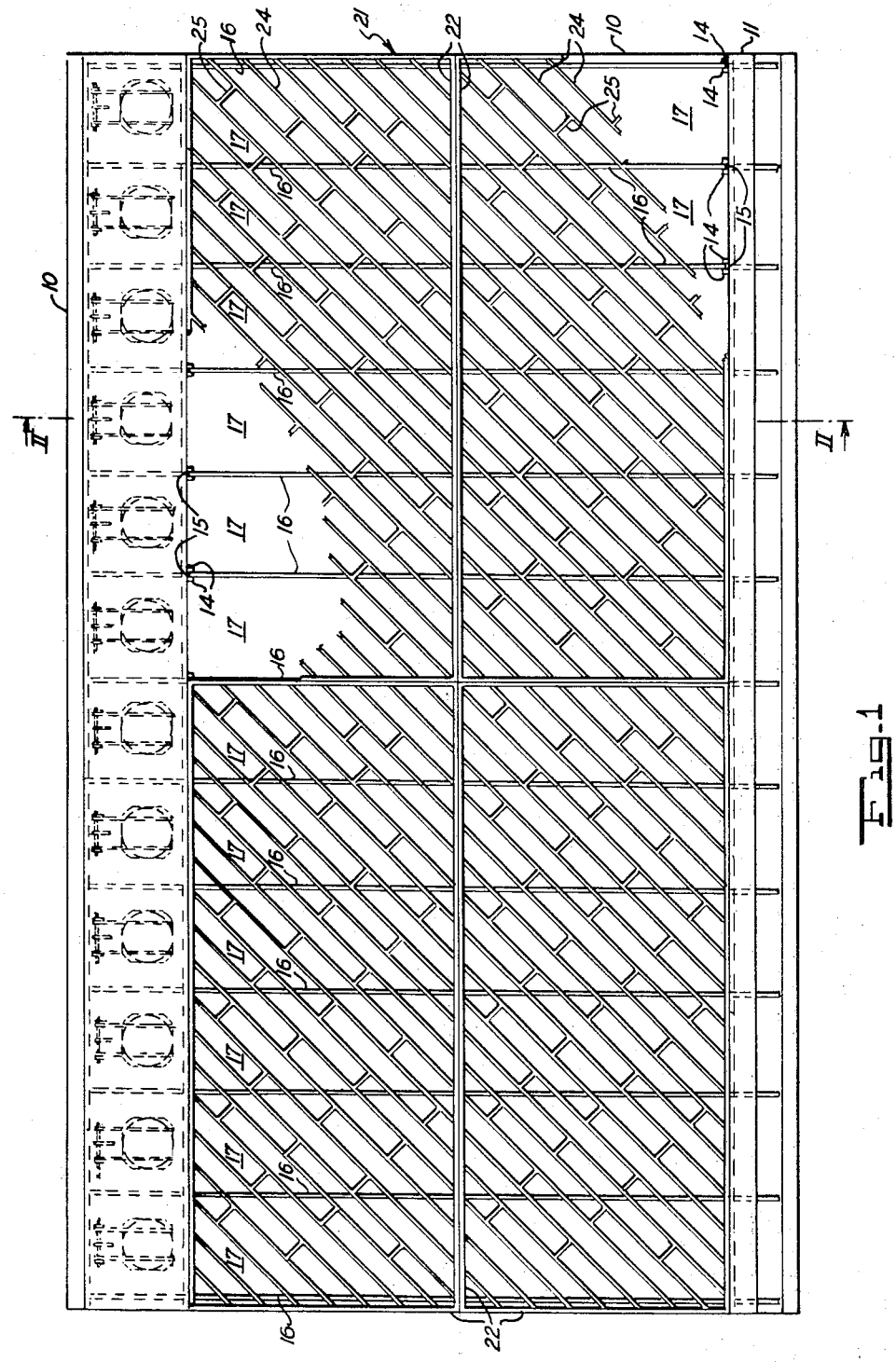
FIG. 1 is a plan view of the cutting table in accordance with the invention with a grating (which is partly broken away to show underlying structure) in place.
Figure 3:
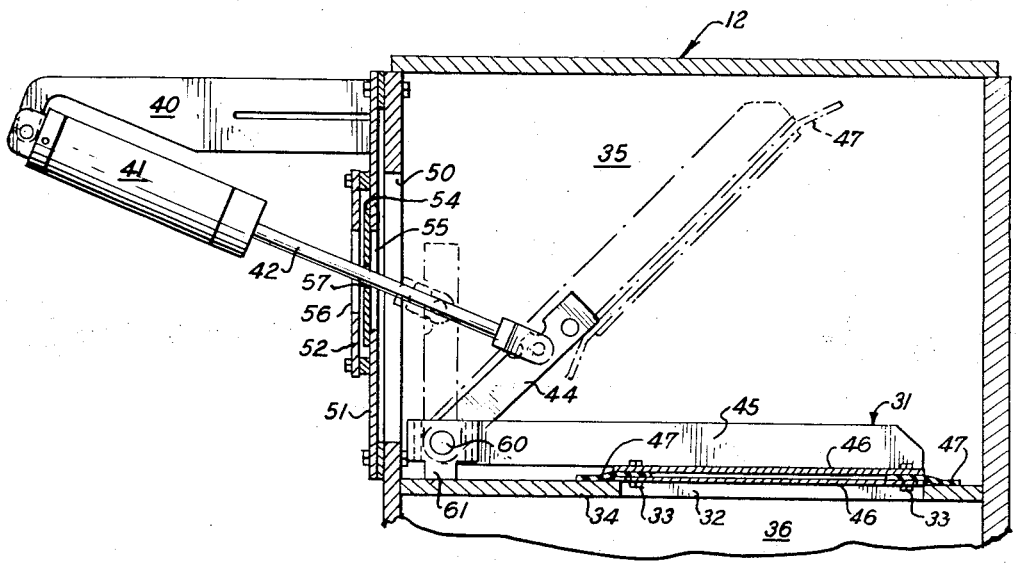
FIG. 3 is a cross sectional view of the exhaust manifold which illustrates the operation of the hinged cover plates.

Referring to FIGS. 1 and 2, it will be seen that a horizontal base plate 10 has welded thereto at one end a side support 11 and at the other end an exhaust manifold 12. A plurality of vertical steel strip members 14 are affixed to the inner facing surface of side support 11 and of the exhaust manifold 12 so as to define facing vertical grooves 15. The metal dividing plates 16 are vertically disposed and have their ends received in grooves 15 so as to constitute vertical sides of duct means or channels 17. The bottom of each channel 17 is formed by the base plate 10 which supports the plates 16. The top of each channel 17 is formed by the work piece, metal plate 20 upon which the cutting operation is performed and which is supported by the grating 21. The grating 21 comprises four steel rectangular frames 22, each of which has a plurality of steel bars 24 which are welded across frame 22 on the diagonal to form a 45° angle with the sides of frame 22. The steel bars 24 are connected by staggered stiffening bars 25 and the grating 21 rests on the tops of the metal plates 16 between the side support 11 and the exhaust manifold 12. The four frames 22 may be spot-welded together to form the assembled grating 21. However, in practice, this has not been found necessary. As assembled, the apparatus is relatively large. Thus, the base plate 10 is 2 inches thick and presents dimensions in plan of about 37 by 22 feet. The metal divider plates 16 rise about 18 inches vertically and measure about 16 feet across horizontally. The grating 21 is approximately 4 inches in depth. The exhaust manifold 12 is approximately 3 feet in width and somewhat over 4 feet high.

The metal plate 20 upon which the cutting operation is to take place is preferably located with one edge adjacent to the exhaust manifold 12 to form, with the metal divider plates 16 and the base plate 10, reasonably continuous channels 17. A plasma cutting torch 26 is placed as desired on the metal plate 20 and it may be guided and caused to travel either manually or automatically along a predetermined path by means well known in the art. The cutting plasma 27 projects below the grating 21. For each channel 17 a photoelectric cell 30 is mounted on the back or outer surface of side support 11 so as to be responsive through an opening 73 to radiation from the cutting flame 27. The photoelectric cell 30 is shown in and described in more detail with reference to FIG. 4. Also, as will be described in more detail hereafter, the photoelectric cell 30 when receiving radiation from cutting flame 27 causes a valve means 31 to open in the manifold 12. Valve means 31 covers and thus controls an opening 32 in a horizontal dividing plate 34 which divides upper and lower chambers 35 and 36, respectively, of exhaust manifold 12. The upper chamber 35 extends the entire length of the exhaust manifold 12 whereas there is a separate lower chamber 36 communicating with each channel 17 through a port 37 into manifold 12. An extension 40 which is rigidly secured to the upper portion of the exhaust manifold 12 pivotally carries an actuating means comprising a pneumatic cylinder 41 which includes a stem 42 connected to an arm 44 which in turn is rigidly connected to a hatch weldment 45 which has affixed thereto the covering plate 46 for opening 32. A circular seal ring 47 is connected by bolts 33 to the covering plate 46 so as to provide a seal about the periphery of the opening 32. Ring 47 is a known type sold by the Banbury Equipment Corporation in connection with vacuum pads and is described in U.S. Pat. No. 3,183,032 to Warfel of May 11, 1965. A rear access opening 50 into upper chamber 35 is covered by a rear cover plate 51 which includes an access cover 52 and a bearing plate 54 disposed between the access cover 52 and the rear cover plate 51. The rear cover plate 51 includes an opening 55 and the access cover 52 includes an opening 56 for stem 42. A further smaller opening 57 is provided in bearing plate 54 which is just large enough to receiver the cylindrical stem 42. The hatch weldment 45 is hinged about a pin 60 which is carried by bearing member 61 welded to the horizontal dividing plate 34.

Figure 4:
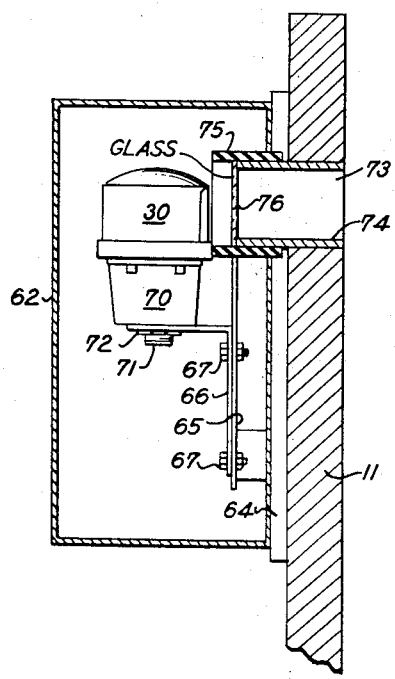
FIG. 4 is a cross sectional view which shows the mounting for the photoelectric cell.
Figures 5, 6:
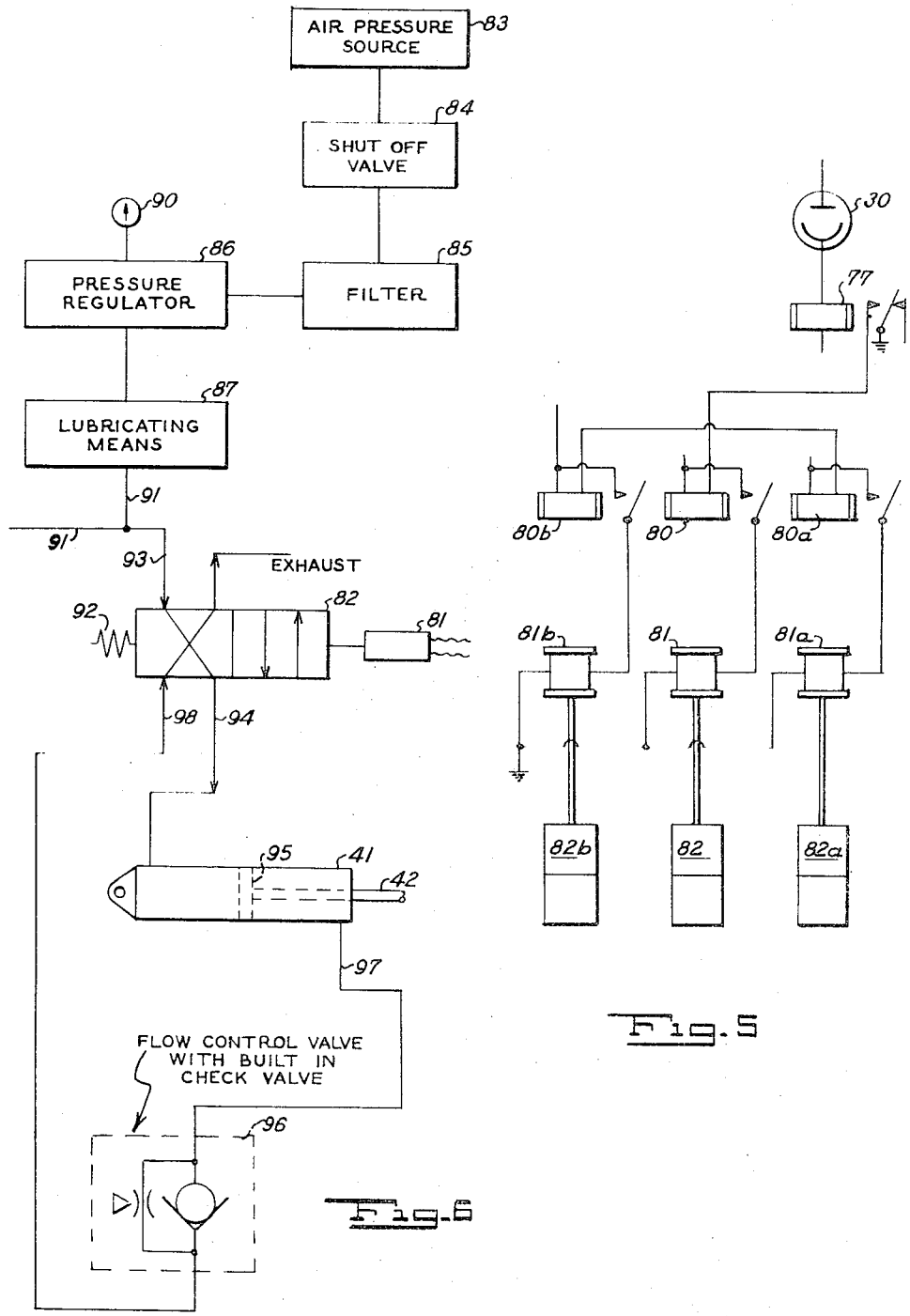
FIG. 5 is a simplified schematic wiring diagram of the circuitry for actuating selected closures in the exhaust manifold.
FIG. 6 is a schematic diagram which shows the pneumatic system utilized to open and close the hinged cover plates.

In FIG. 4, a typical photoelectric cell 30 is shown mounted on the side support 11. Cell 30 is enclosed within a closure 62 which is attached to mounting bars 64 which in turn are secured to side support 11. A mounting panel 65 is affixed to closure 62 and carries a bracket 66 which is secured thereto by bolts 67. The photoelectric cell receptacle 70 is mounted on bracket 66 by means of a threaded nipple 71 which passes through an opening in bracket 66 and receives a nut 72. An opening 73 in side support 11 receives a nipple 74 which extends outwardly and carries on its end a soft rubber hose member 75. Adjacent to the end of nipple 74 and maintained in position by hose member 75 is a clear glass plate 76. A nipple 74 is aligned with each channel 17 so that light emanating therein from the cutting flame 27 is received via glass plate 76 by cell 30. It will be understood that wiring details are not shown in FIG. 4 inasmuch as to do so would not assist in understanding the invention. In FIG. 5, however, a simplified wiring diagram for one of the photoelectric cells 30 is set forth.

As shown in FIG. 5, each cell 30 controls, through a photo relay 77, three further relays 80, 80a and 80b which in turn energize three solenoids 81, 81a and 81b which, still further, actuate pneumatic valves 82, 82a and 82b which, in turn, cause valve means 31 aligned with the cell 30 involved and the adjacent valve means to open or close. Thus when cell 30 responds to light radiated by the cutting flame 27, the photo relay 77 closes and further relays 80, 80a and 80b are also caused to close and energize solenoids 81, 81a, and 81b to move pneumatic valves 82, 82a and 82b whereby the valve means 31 aligned with the corresponding cell 30 is caused to open and the valve means 31 on each side thereof are also caused to open. Each of relays 80, 80a and 80b, and photo relay 77 are biased so as to be open when not energized due to light radiation received by cell 30. Also it should be understood that manually controlled overrides, not shown, are preferably provided for the photo relays 77 for each cell 30.

FIG. 6 is a schematic diagram of the pneumatic system which is utilized to open and close the individual valve means 31. Thus air is supplied from an air pressure source 83 through a stop valve 84, which is normally open when the system is operative, through a filter 85, a pressure regulator 86, and lubrication means 87. A gauge 90 is connected to the regulator 86 to show the regulated air pressure in the system. The main pneumatic line 91 has a plurality of branches each leading to a pneumatic valve such as branch 93 leading to valve 82 controlled by solenoid 81. Pneumatic valve 82 is spring biased by a spring 92 to the position shown in FIG. 6 whereby valve means 31 is closed. The cylinder 41 thus receives air under pressure from branch 93 via pneumatic valve 82 and hose 94 which connects the pneumatic valve 82 with the upper portion of the cylinder 41. Air from the bottom portion of the cylinder 41 under piston 95 is bled therefrom via first hose 97, then flow control valve 96 which has a built-in check valve, next line 98 and finally through the pneumatic valve 82 to the atmosphere. However, when pneumatic valve 82 is moved to the left (as seen in FIG. 6) by actuation of solenoid 81, branch 93 is aligned through pneumatic valve 82 with the line 98 whereby air under pressure flows through flow control valve 96 and hose 97 into the lower portion of cylinder 41 to cause piston 95 together with stem 42 to move to the left (as seen in FIG. 6) and open the valve means 31. Air in the upper portion of cylinder 41 is bled to the atmosphere via hose 94 and pneumatic valve 82. It will be appreciated that in the apparatus disclosed there are 12 channels 17, 12 photoelectric cells 30, and 12 valve means 31 each with the associated electrical and pneumatic actuated circuits. And also it should be understood that whereas each photoelectric cell actuates not only its corresponding valve means 31 but also the valve means 31 adjacent thereto on either side, this does not apply to the valve means at the far ends where only the inboard adjacent valve means is actuated by the outboard photoelectric cells 30.

As may be seen in FIG. 7, a bag house 100 which includes air pervious bags and fan means, is located outside the finishing building 101 and receives exhaust from the upper chamber 35 of the exhaust manifold 12 through an exhaust duct 102 which extends through an opening in the wall of finishing building 101. Means for separating contaminents as may be utilized in bag house 100 are conventional and generally widely known in the field to which the invention pertains. Therefore, a description of their exact nature and type is not necessary for an understanding and use of the invention by a person skilled in the art.

In operation, a work piece comprising metal plate 20 which is to be cut by a plasma arc torch 26 is placed on the grating 21 and a pattern is laid out for the plasma cutting torch 26 to follow. The cutting is then commenced and the cutting flame 27 which extends below grating 21 immediately causes cell 30 in the same channel 17 to open up the corresponding valve means 31 and the valve means 31 on either side adjacent thereto. Smoke is initially generated or produced by the cutting torch 26 under plate 20 and it is immediately drawn through channel 17 and via port 37 into the lower chamber 36 of exhaust manifold 12. There it makes an abrupt 90° turn upward so that heavy air borne particles are flung to the bottom of the chamber 36 and the smoke travels through the opening 32 into the upper chamber 35 of exhaust manifold 12. Smoke is carried through such chamber 35 into the exhaust duct 102 and finally into the bag house 100 by exhaust means such as exhaust fans which are included in the bag house 100. At this location, the contaminents are separated from the exhaust gases and the air leaving the bag house is substantially uncontaminated. As the cutting torch 26 moves along its predetermined pattern whereby the cutting flame 27 travels from one channel 17 to the adjacent channel 17 a different photoelectric cell 30 is actuated so that at all times the channels 17 being exhausted are only those in which the flame 27 is received and those on either side of the channel receiving the cutting flame 27. This not only makes the cutting table more efficient inasmuch as there is no period of time in which a cutting flame 27 is over a channel not being exhausted, but also it precludes a build-up of smoke in the adjacent channel 17. As the cutting torch 26 moves along a metal plate 20 it also tends to cut the steel bars 24 although if the torch is properly set, it will not cut them entirely but rather tends to cut notches in them. As a practical matter, it is highly unlikely that the torch 26 will travel parallel to the steel bars 24 for any substantial distance.

When any given valve means 31 is not longer actuated in an open position by a cell 30, it closes, and due to the weight of the plate 46 and force exerted by air cylinder 41 its disposition on the partition plate 34 with resilient lip members 47 is such that leakage of air through the opening 32 is minimal.

Having thus described our invention, what we claim as new and desire to secure by Letters Patent of the United States is:

1. A method of removing smoke and fumes produced by the flame cutting of large metal plate received horizontally on a burning table wherein the cutting torch is moved relative to the plate, said method comprising the steps of producing the smoke and fumes under said metal plate, confining the space under said torch to a channel, and exhausting said channel simultaneously with said production of smoke therein.

2. A method in accordance with claim 1 wherein the exhausting of said channel is actuated by the receipt of said flame therein.

3. A method of removing smoke and fumes generated by a cutting torch cutting a large metal plate supported in a horizontal position on a burning table which comprises the steps of:
   moving the cutting torch along the upper surface of the plate with the flame cutting said plate extending downwardly to below said plate;

continually defining duct means under said plate which is receiving said flame, smoke and fumes generated by the cutting torch;

continually sensing said flame extending below said plate; and continually exhausting smoke and fumes generated by said cutting torch through said duct means in response to the sensing of said flame.

4. A method of effectively removing smoke and fumes generated by a cutting torch cutting a large metal plate supported in a horizontal position on a burning table which includes a plurality of channels underlying said plate, which comprises the steps of:

moving the cutting torch along the upper surface of the plate with the flame cutting said plate extending downwardly into at least one of said channels;

continually sensing in each of said channels for the receipt of said flame by means of separately monitoring each of said channels by a separate sensor means; and removing smoke and fumes generated by said torch through the channel receiving said flame by actuating exhaust means having a flow communication therewith via the channel wherein said flame extends in response to the sensing of said flame therein.

5. A method in accordance with claim 4 wherein said sensor means causes the exhausting of each said channel adjacent the channel receiving said flame.

6. A method in accordance with claim 4 wherein each said channel connects with a manifold which in turn connects to said exhaust means, there being a plurality of valve means in said manifold, a separate of said valve means for interrupting flow communication between each said channel and said exhaust means, each said valve means being normally closed, the sensing of flame in the channel receiving same causing the valve means interrupting flow communication therein to said exhaust means to open.

7. A method in accordance with claim 6 wherein the sensing of flame in the channel receiving said flame causes the opening of valve means for each said channel adjacent the channel receiving said flame.

8. A method of removing smoke and fumes generated by a plasma cutting a material carried on a supporting means wherein a plurality of channels underlie said material, which comprises the steps of:

moving said plasma along said material, said plasma being caused to extend through said material sufficiently to generate electromagnetic radiations into the underlying channel;

separately sensing each of said channels for receipt of said electromagnetic radiations; and selectively exhausting the channel in which said radiations are sensed whereby smoke and fumes generated therein by the plasma cutting are removed.

9. A method in accordance with claim 8 wherein said sensing of said radiations in a said channel actuates the exhausting of such channel and each channel adjacent thereto.

10. A method in accordance with claim 8 wherein each said channel separately connects with manifold means having a flow communication to the intake of means for exhausting, a plurality of valve means in said manifold means, a separate valve means for interrupting flow communication between the corresponding of said channels and said means for exhausting, each said valve means being normally closed, the sensing of said radiations in the channel receiving same causing the corresponding valve means to open whereby flow communication is established between said channel receiving said radiations and said means for exhausting.

11. A method in accordance with claim 10 wherein said sensing of said radiations in a said channel activates the valve means corresponding to each channel adjacent to said channel wherein the valve means corresponding to said adjacent channels are caused to open.

12. A method of effectively removing smoke and fumes generated by a torch cutting a large metal plate supported in a horizontal position on a burning table which includes a plurality of channels underlying said plate, the method comprising the steps of:

moving the cutting torch along the upper surface of the plate with the flame cutting said plate extending through the plate to the upper aspect of at least one of said channels;

continually sensing the position of said flame relative to said channels; and removing smoke and fumes generated by the cutting operation by actuating exhaust means having a flow communication with the channel under said flame in response to sensing the position of said flame, whereby said channel is exhausted by said exhaust means;

13. A method in accordance with claim 12 wherein exhaust means is provided for each channel adjacent to the channel under said flame, said each channel also being exhausted by exhaust means in response to sensing the position of said flame.

14. A method in accordance with claim 12 wherein each said channel is received by a manifold which connects to said exhaust means, said manifold having a separate valve means interrupting between each said channel and said exhaust means, each said valve means being normally closed, the sensing of said position of said flame causing the valve means for the channel underlying said flame to open.

15. A method in accordance with claim 14 wherein the valve means for channels adjacent to the channel underlying said flame are also caused to open by said flame position sensing.

16. A method of effectively removing smoke and fumes generated by plasma cutting of a horizontally disposed steel plate carried on a supporting means wherein a plurality of channels underlie said steel plate, the method comprising the steps of:

moving said plasma along the upper surface of the steel plate so as to cut downwardly through said plate;

continually determining the position of said plasma relative to said channels; and removing smoke and fumes generated by the plasma cutting operation by actuating exhaust means having a flow communication with the channel which is determined to be under the portion of said plate being cut by said plasma.

17. A method in accordance with claim 16 wherein the determination of the position of said plasma relative to said channels is accomplished by sensing radiations from said plasma.

18. A method in accordance with claim 17 wherein a photoelectric cell in each channel is adapted to sense said radiations therein from said plasma, said photoelectric cell actuating exhaust means having a flow communication with the channel under the portion of said plate being cut by said plasma whereby it is exhausted of fumes and smoke produced by the cutting operation.

19. A method in accordance with claim 18 wherein said photoelectric cell sensing radiations in its corresponding channel actuates exhaust means for channels adjacent thereto which are also exhausted of any smoke and fumes which may be received therein due to the proximity of the cutting operation.

20. A method in accordance with claim 19 wherein said channels connect into a manifold through valve means corresponding to each channel and said manifold connects to said exhaust means, the actuating of said exhaust means for a selected channel comprising the opening of said valve means corresponding to the selected channel.

* * * * *